March 12, 1974   J. G. RUZZO   3,796,639
BIOLOGICAL INCUBATOR

Filed Sept. 7, 1971

INVENTOR.
JOSEPH G. RUZZO
BY
Morgan, Finnegan, Durham & Pine
ATTORNEYS

March 12, 1974  J. G. RUZZO  3,796,639
BIOLOGICAL INCUBATOR

Filed Sept. 7, 1971  3 Sheets-Sheet 2

INVENTOR.
JOSEPH G. RUZZO
BY
Morgan, Finnegan, Durham & Pine
ATTORNEYS

United States Patent Office

3,796,639
Patented Mar. 12, 1974

---

3,796,639
BIOLOGICAL INCUBATOR
Joseph G. Ruzzo, Schenectady, N.Y., assignor to
General Electric Company
Filed Sept. 7, 1971, Ser. No. 178,023
Int. Cl. C12k 1/10
U.S. Cl. 195—139                                    11 Claims

ABSTRACT OF THE DISCLOSURE

Portable incubators for biological testing devices, such as culture pipettes, comprise a casing and a removable top and a central heating core. The testing devices are incubated in an annulus defined by the center core and the inside surface of the casing, preferably positioned in a holder comprising a base, two or more horizontal tiers above and parallel to the base and supports or legs holding the tiers in alignment. Also provided are novel portable holders for transporting and storing bacteriological culture pipettes.

---

This invention relates to a biological incubator and to holders for biological testing devices which may be used with the incubators. More particularly, it concerns portable cylindrical biological incubators having a center core heater.

BACKGROUND OF THE INVENTION

Diagnostic devices have recently become available which can be used to rapidly and economically screen biological fluids, such as sputum, urine, blood and the like for the presence of chemical agents, such as drugs and hormones, or of microorganisms, such as bacteria, molds and the like. Such devices may, for example, comprise nutrient agar surface-coated slides or internally-coated tubes. To use such devices, a specimen of the suspect fluid is brought into contact with the nutrient agar, then the so-treated device is set aside in a moderately warm, e.g., 37±2° C., aseptic atmosphere. If the fluid contains viable microorganisms, they will grow on or in the nutrient agar and after a few hours, growth will have reached the point where the colonies of microorganisms can be observed and, if desired, counted.

It is a conventional technique to use biological incubators to maintain the moderately warm conditions, mimicking animal body heat, and these often comprise either a full size room, thermostatically controlled, or devices about the size of one of the larger household-type refrigerators, fitted with air circulators, and the like.

Although the recently developed diagnostic devices are relatively small, can be kept and used in any physician's office and can even be stored in a patient's medicine chest at home, they cannot be incubated easily because the common incubators are large, non-portable and expensive. Although small, box-like incubators have been produced, they are of a size and shape insufficient to accommodate certain diagnostic devices, such as slides and especially tubes.

For example, dental warmers are known in the prior art which utilize incandescent light heating of a radiant platform for the purpose of warming dental anesthetics. Since this platform is heated by a light bulb located at the base of the warmer, the electrical connections are exposed to fluid drippings and accumulated moisture. In addition, such a device will not provide appropriate incubation temperatures and temperature distribution for bacteriological culturing devices of the type under consideration.

One especially useful diagnostic device comprises a relatively thin tube, usually of thermoplastic material, about 10 to 12 inches long and about ⅛ inch in outside diameter. The inside of the tube is coated with a layer of solidified nutrient agar. In use, the lower end of the tube, which is called a culturing pipette, is dipped into a fluid, such as urine, suspected of containing bacteria, and the fluid is sucked up into contact with the layer of nutrient agar. The fluid is then drained out and the treated tube is ready for incubation. Incubation is carried out with the tube in a vertical position in a conventional, i.e., large, biological incubator and any bacteria will show their presence in the form of discrete colonies after several hours.

It is a primary object of this invention to provide a portable, biological incubator which includes a centrally-located heating core to maintain the proper incubation temperature.

It is a further object of this invention to provide a portable incubator with sufficient versatility to incubate disposable bacteriological testing devices such as dip slides and culture pipettes.

Still another object of the invention is to provide a portable incubator capable of vertically holding a plurality of testing devices, up to 100 culture pipettes, for example, and capable of maintaining a uniform temperature of 37±2° C. along the entire length of each pipette.

A further object of this invention is to provide an electrically safe, light-weight incubator which may be held in one hand and is easily portable.

In one of its embodiments, it is an object of this invention to provide an incubator whose contents can be viewed from the outside without the need to open it or otherwise disturb the contents.

It is also a primary object of this invention to provide a portable stand for biological testing devices, such as culture pipettes. In one of its embodiments, it is an object of this invention to provide such a stand for use with the portable biological incubators of this invention.

DESCRIPTION OF THE INVENTION

According to this invention a portable biological incubator comprises (i) a vertical casing closed at the bottom;
(ii) a removable closure on top of the casing;
(iii) a pipe extending downwardly from the cover member centrally into the casing to a location at or near the bottom of the casing, or extending upwardly from the base of the casing centrally into the casing to a location at or near the top of the casing, the pipe being in a spaced relationship to define with the casing an annulus extending downwardly from the top of the pipe to the bottom of the pipe; and
(iv) means in the pipe to heat the annulus by radiation, convection or a combination of radiation and convection.

In a preferred embodiment the removable closure and the pipe are in combination, the combination comprising a horizontal cover member and a pipe extending downwardly from the cover member centrally into the casing to a location at or near the bottom of the casing.

In another preferred embodiment, the pipe includes a plurality of strategically located perforations to produce uniformity of heating throughout the annulus.

In another preferred embodiment, the casing will be transparent so that the interior of the incubator may easily be seen from the outside.

It is a preferred feature of the invention to provide the incubator with a removable support for the biological testing devices. This makes it convenient to load and unload the incumbator with many such devices at one time and holds them in a fixed position during incubation.

An especially preferred removable support means comprises (i) a generally circular planar base;
(ii) a plurality, i.e., at least two, generally circular tier members, spaced at strategic locations, depending on the type of biological testing device to be incubated, above and parallel to the base, each tier member having a central aperture to slide over the central pipe, and the tiers being pierced with holes sized to accommodate a plurality, e.g., up to 100, of culturing pipettes; and a plurality, i.e., 2 or 3 or more, vertical supporting members extending upwardly from the outer edge of the base, being fixed to the outer edge of each of the tiers and terminating at or above the uppermost of the tiers. It will be understood that the length of the supporting members will be no greater than the length of the annulus in the incubator. It is preferred that at least some of the supporting members terminate at their top in some type of handle, e.g., a grasping ring or a fold-away handle, to facilitate removal of the holder from the incubator. A fold-away handle, such as the familiar supporting half hoop or arched handle of a kettle or pail, allows the removable support to be easily carried. When the support is placed within the incubator, the handle can be folded back, thus allowing for easy insertion of the combination top and heating pipe. If necessary, e.g., in those incubators having the pipe integral with the base, the portable holder will have a central aperture in the base to slide over the pipe.

It is a preferred feature of this invention to heat the incubator electrically, although the heating core can, if desired, be heated in other ways, e.g., by circulating a warm fluid therethrough. As is obvious, if a warm fluid is used, the pipe will not be pierced or contain the strategically located holes found useful to promote uniform heat circulation in the electrically-heated embodiments. For electrical heating, it is preferred to use the heat from incandescent lights, heating tapes or cartridge heaters, in combination with a source of electrical energy.

While not essential, sometimes it is desirable to include in such electrical heating means a temperature sensitive element, e.g., a bimetallic or mercury activated thermostatic switch, located in the annulus to close the electrical circuit when the temperature in the annulus falls below a predetermined level and to open the electrical circuit when the temperature exceeds a predetermined level.

In addition to the biological incubator, the persent invention also contemplates a portable holder for bacteriological culture pipettes of the type described comprising:

(i) a generally circular planar base;
(ii) a plurality of generally circular planar tier members spaced at strategic locations above and parallel to the base and being pierced to accommodate bacteriological culture pipettes; and
(iii) a plurality of vertical supporting members extending upwardly from the outer edge of the base, being fixed to the outer edge of each of the tier members, and terminating at or above the uppermost of the tier members. For culture pipettes of the type described above, generally two tier members and two or three vertical supporting members will be used. If the vertical supporting members are properly spaced, a removable dish, e.g., petri dish, can be placed at the base to catch any fluid drippings. To accomplish this, there should be an area of about 180° around the circular support where there are no vertical supporting members. A preferred feature of this embodiment is a portable holder for such pipettes in which each tier (and the base, if necessary) includes a central aperture so that if it is desired to use the holder with a biological incubator according to this invention, the centrally heated core will slip through the aperture in the tiers.

DESCRIPTION OF THE DRAWINGS

The invention will now be described by way of examples with reference to the accompanying drawing in which:

In FIG. 4, a number of bacteriological culture pipettes are shown to be held in the vertical position of use in the annulus of the incubator, mounted in a holder according to this invention.

The biological incubator illustrated in FIGS. 1–3 comprises outer casing 2 which may be of any conventional material, but preferably is transparent, such as glass or, because many plastics are both light in weight and transparent, a material such as acrylic, e.g., poly(methyl methacrylate). The bottom of the casing 2 is closed in any conventional manner, such as, for example, by use of circular base 4 which can be made of metal, wood, plastic or similar materials. Removable, combined closure-heater means 6 comprises generally horizontal cover member 12 and in combination therewith, pipe 8 extending downwardly centrally into casing 2 and terminating, e.g., with bottom piece 10. Pipe 8 can be fabricated of metal or plastic material, such as aluminum, acrylic, a thermoset phenolic laminate or similar materials, it being only necessary to select an inert material which will not be affected adversely by being internally heated. Pipe 8 is spaced so as to provide annulus 34 between its outer surface and the inner surface casing 2. Shown diagrammatically inside of pipe 8 are two incandescent lamps 18, which are one convenient means to achieve uniform heating by radiation and convection around the central core. Pipe 8 can include means (not shown) exclusive of the heat source, such as strategically located holes or perforations to promote uniformity of heating throughout the annulus (shown in FIG. 6 as elements 33). Although FIG. 1 shows the use of incandescent bulbs as the only heating source within the pipe, other sources such as heating tapes and cartridge heaters are equally feasible. Power cord 16 forms part of the electrical heating circuit to the power supply and passes from cover 6 through a slot in removable plug 14, which also provides access to the heating elements. Shown in broken lines is optional thermostat 30 which may be used to help provide a predetermined temperature setting. The sensitive element in thermostat 30 is located within annulus 34. Also in annulus 34 is illustrated a portable holder for biological testing devices according to this invention. The holder comprises generally circular base 24 which may be any conventional relatively thin, strong material such as metal, e.g., brass, or plastic; and two tiers 26 of relatively thin, strong material such as metal, e.g., brass, or plastic. The tiers are aligned parallelly to the base, and each include a central aperture to accommodate pipe 8 and pierced with a number of holes 32, which are aligned so that the biological culture pipette 20, one of which is shown, is permitted to stand upright. Two supporting members or legs 22 which maybe of metal, e.g., brass, or plastic, are shown extending upwardly from their point of attachment to base 24, being fixed at the outer edge of each of tiers 26 and terminating near the top of annulus 34 in grasping rings 28 to facilitate insertion and removal.

Figure 1:
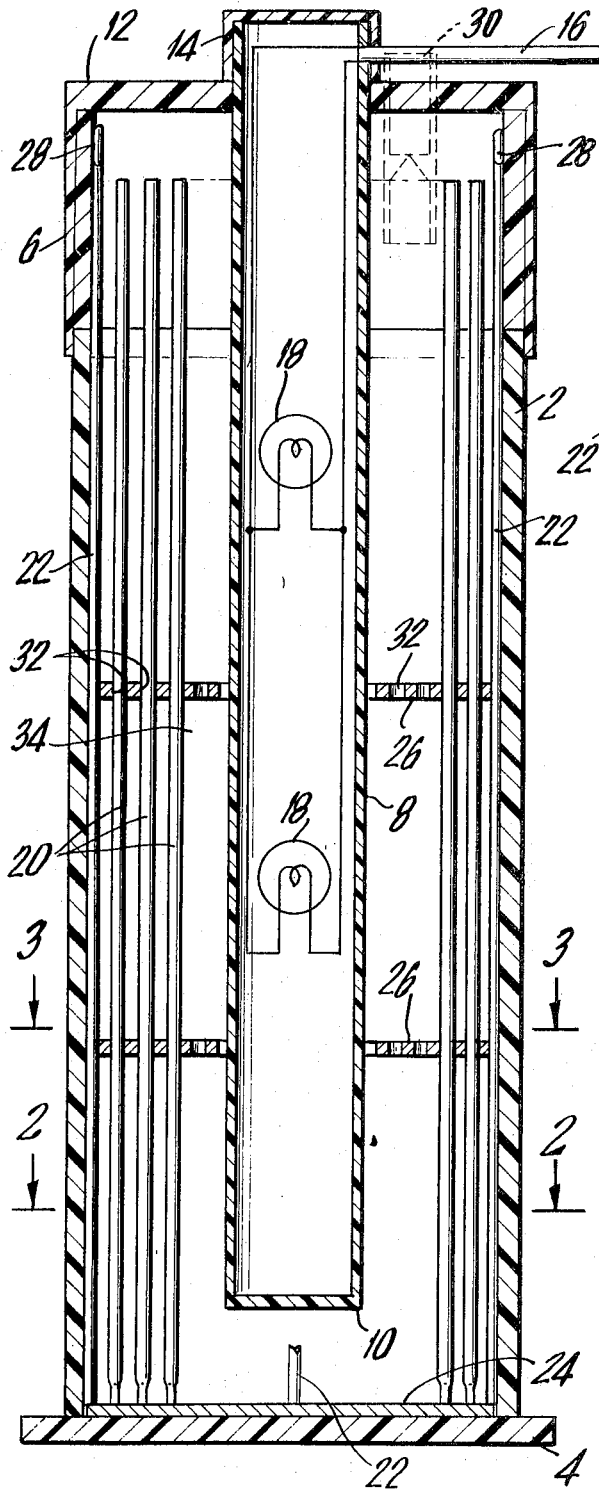
FIG. 1 shows, somewhat diagrammatically, a vertical cross-section of a biological incubator according to this invention having a combination closure and heating pipe.
Figure 2:
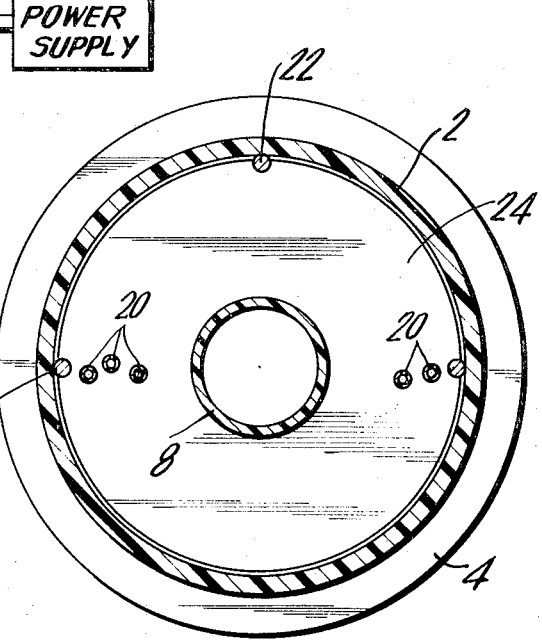
FIGS. 2 and 3 are horizontal cross-section views of the biological incubator shown in FIG. 1 taken along lines 2—2 and 3—3, respectively.
Figure 3:
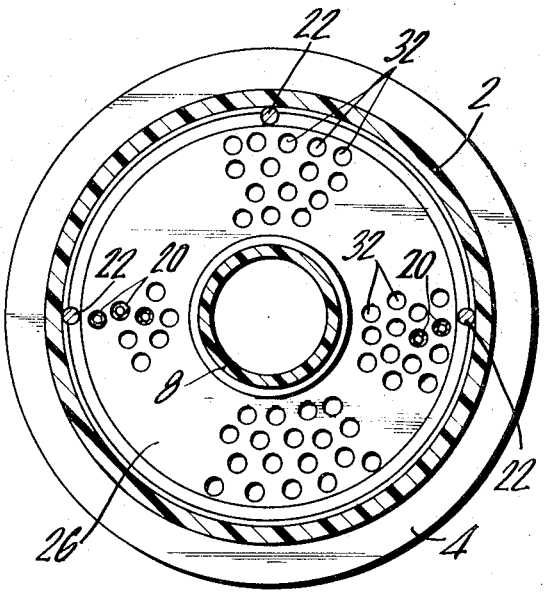
Figure 4:
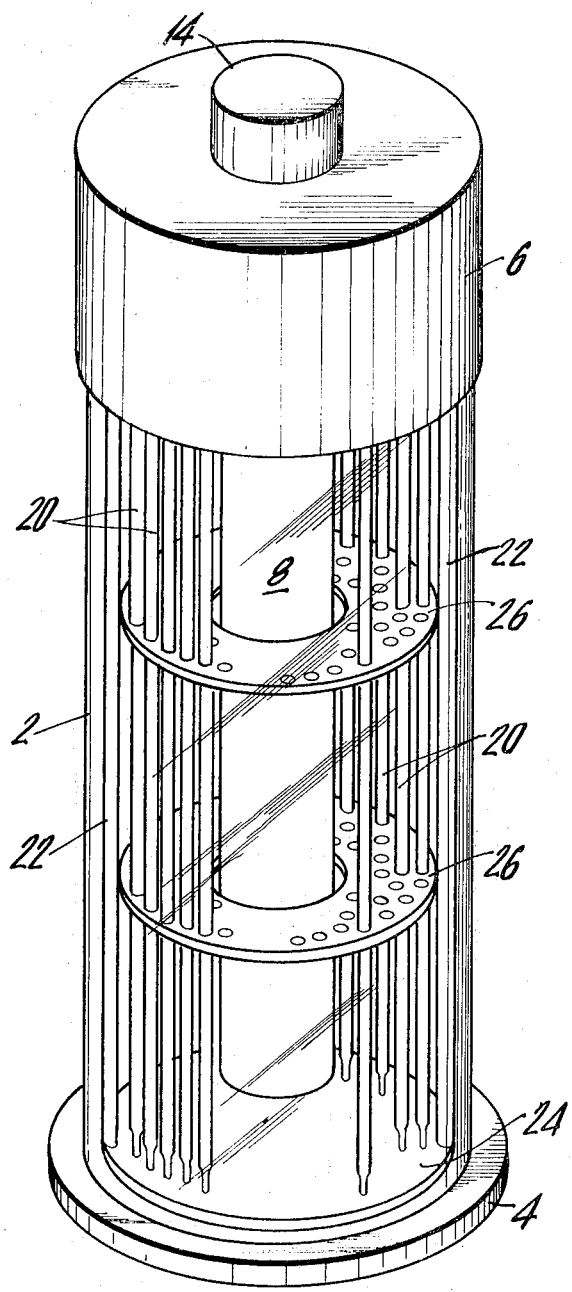
FIG. 4 is a perspective view of the biological incubator according to this invention shown in FIG. 1.

While it is in no way intended to be limiting, the dimensions of a typical apparatus as is shown in FIG. 1 can be as follows:

The overall height is 12½ inches and the outer diameter is 4¼ inches. The circular base is ¼ inch thick with a 5 inch diameter. The pipe is 1¼ inches in outer diameter and 11 inches in length. The inside diameter of the acrylic casing is 3⅞ inches and it is 10 inches long.

Test data on such a unit show that very efficient temperature regulation is achieved if pipe 8 comprises a phenolic laminate and is heated internally with one 5 watt and one 6 watt bulb. Such a unit after two continuous weeks of testing with one hundred pipettes in the annulus maintains temperatures between 39.5° C. at the inner row of pipettes and 36.0° C. at the outer row of pipettes.

In the embodiment shown in FIG. 1, the cover is made in three pieces to provide convenient spacing and an overlapping seal. Such manner of construction and dimensions are not critical to the invention and obvious modifications can be employed. Also, in the embodiment shown, bottom piece 10 of pipe 8 terminates about one to two inches above base 4. While not essential or critical, it is desirable to terminate the pipe at about this location, because any possible fluid drippage and subsequent accumulation at the bottom of the incubator can never contact or otherwise interfere with the operation of the electrical components of the apparatus.

It is recognized for the purposes of this application that pipe 8 can be made integral with base 4. Such an embodiment is shown in FIG. 6.

Figure 6:
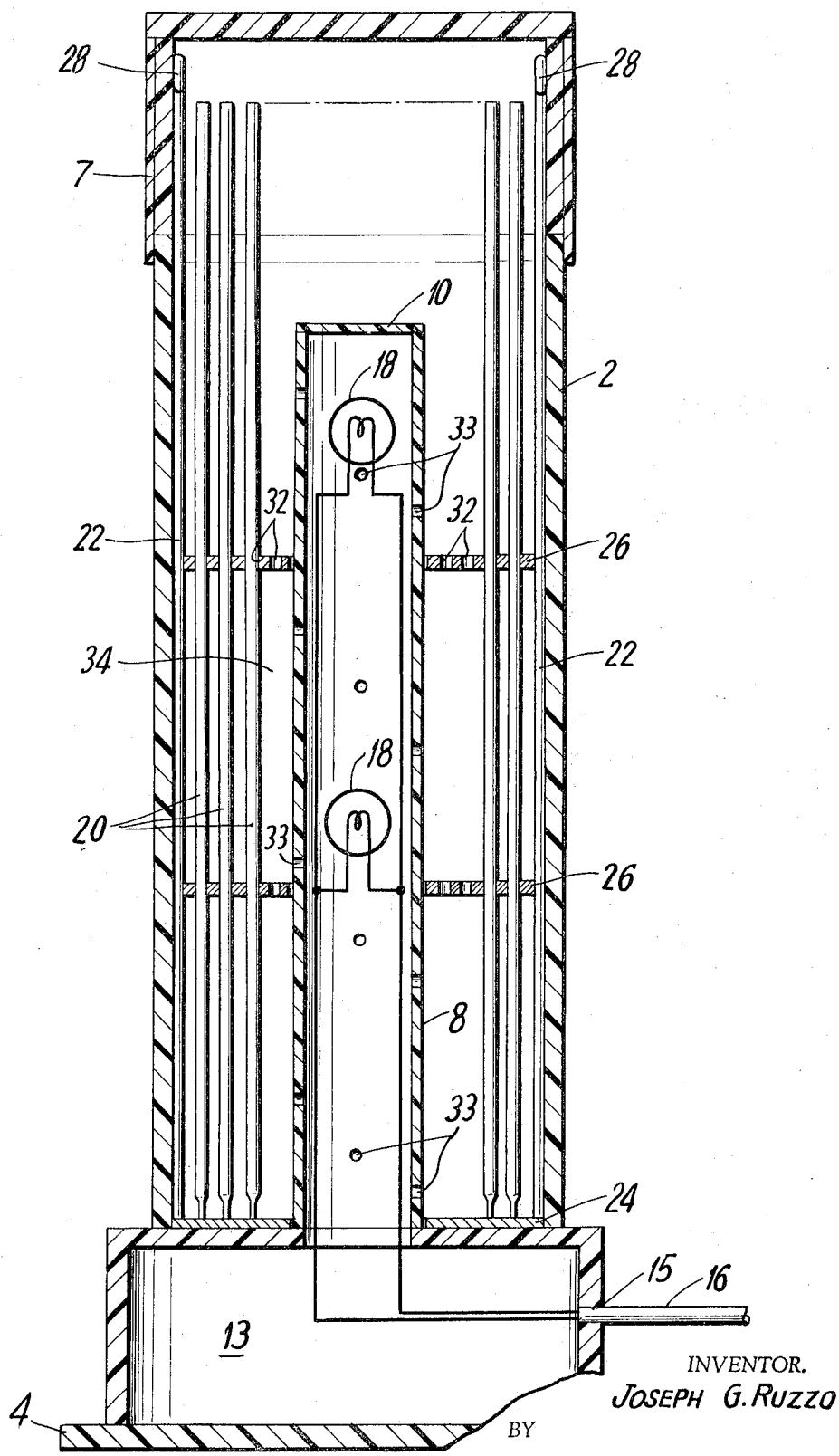
FIG. 6 shows, somewhat diagrammatically, a vertical cross-section of a biological incubator according to this invention, having a removable closure and the central heating pipe integral with the base.

The incubator shown in FIG. 6 comprises outer casing 2 which is closed at the bottom by base 4 and intermediate, optional, chamber 13. The chamber provides space to run the leads from power cord 16 through aperture 15 into pipe 8 extending upwardly into casing 2 to complete the circuit to incandescent bulbs 18. Obviously, other similar means can be provided to bring electrical power to the heaters. Pipe 8 is provided with strategically located perforations 33 to promote uniformity of heating throughout annulus 34. This embodiment is provided with an optionally three piece removable closure 7.

Because some of the electrical components of the embodiment of FIG. 6 are located in the base, this is somewhat less preferred than that of FIG. 1 since steps should be taken to insure that the components are completely sealed off from the incubator environment for electrical safety.

Figure 5:
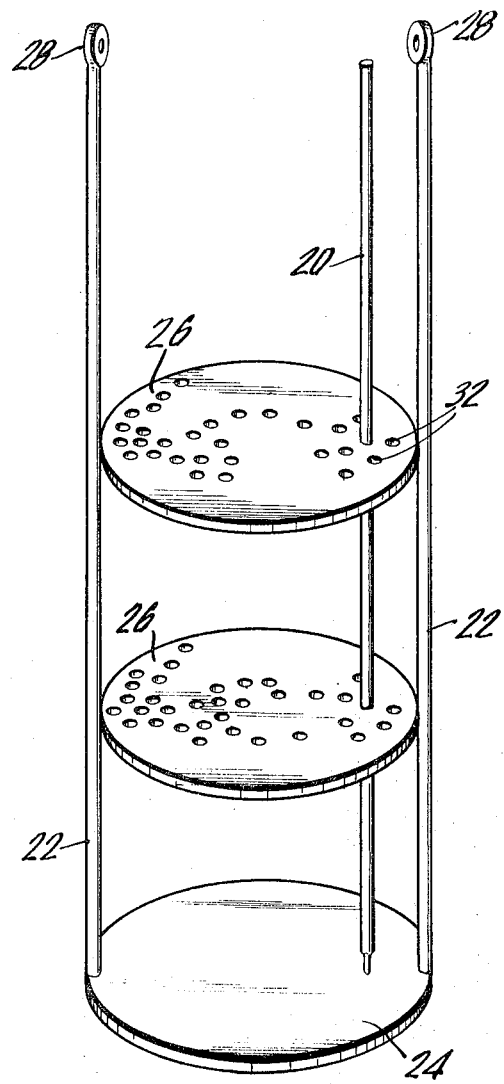
FIG. 5 shows in perspective view of portable holder for bacteriological culture pipettes according to this invention. In the embodiment shown the holder is primarily to be used as a stand for storage, preparation or carrying of the pipettes, one of which is shown in place. There are no central apertures in the perforated tiers of this holder and thus it is not intended for incubation in the center core heating apparatus of this invention. When not intended for use with the central core incubating device, such portable holders may be square or assume other shapes and the spacings of the tiers varied.

In FIG. 5 is shown a stand for holding bacteriological culture pipette 20, one of which is shown in place. The stand comprises base 24, which may be a thin, strong material, such as, metal, e.g., brass, or plastic, above which are arranged two perforated tiers 26, which include perforations 32. The tiers are maintained in horizontal alignment above the base by two supporting members or legs 22, which also maintain perforations 32 in the respective tiers in substantial alignment, so that the culture pipettes are held in a vertical position for storage or transportation.

From the foregoing description and examples it is obvious that a convenient, economical and portable apparatus for incubating biological testing devices has been discovered. Obvious modifications will suggest themselves to those skilled in the art. For example, interchangeable stands can easily be provided such that the incubators can accommodate dip slides and other devices in addition to pipettes.

The invention is not to be limited by the above description but is to be defined only by the appended claims.

I claim:
1. A biological incubator comprising
   (i) a vertical casing closed at the bottom;
   (ii) a removable closure on the top of the casing;
   (iii) a pipe extending downwardly from the closure centrally into the casing to a location at or near the bottom of the casing or extending upwardly from the base of the casing centrally into the casing to a location at or near the top of the casing, said pipe being in spaced relationship to define with the casing an annulus extending downwardly from the top of the pipe to the bottom of the pipe;
   (iv) means in the pipe to heat said annulus by radiation, convection or a combination of radiation and convection; and
   (v) removable support means in the annulus to hold a plurality of culturing pipettes or dip slides, said support means comprising
      (a) a generally circular planar base;
      (b) a plurality of generally circular planar tier members, spaced at strategic locations above and parallel to said base, each tier member having a central aperture to accommodate the pipe, and being adapted to accommodate said pipettes or slides; and
      (c) a plurality of vertical supporting members extending upwardly from the outer edge of said base, being fixed to the outer edge of each of said tiers, and terminating at or above the uppermost of said tier members.
2. A biological incubator as defined in claim 1 wherein said removable closure and said pipe are in combination, said combination comprising a horizontal cover member and a pipe extending downwardly from the cover member centrally into the casing to a location at or near the bottom of the casing.
3. A biological incubator as defined in claim 1 wherein said pipe includes a plurality of strategically located perforations to produce uniformity of heating throughout the annulus.
4. A biological incubator as defined in claim 1 wherein said casing is transparent.
5. A biological incubator comprising
   (i) a vertical casing closed at the bottom;
   (ii) a removable closure on the top of the casing;
   (iii) a pipe extending downwardly from the cover member centrally into the casing to a location at or near the bottom of the casing or extending upwardly from the base of the casing centrally into the casing to a location at or near the top of the casing; said pipe being in spaced relationship to define with the casing an annulus extending downwardly from the top of the pipe to the bottom of the pipe;
   (iv) means in the pipe to heat said annulus by radiation, convection or a combination of radiation and convection; and
   (v) removable support means in the annulus to hold a plurality of culturing pipettes, said removable support means comprising:
      (a) a generally circular planar base;
      (b) a plurality of generally circular planar tier members, spaced at strategic locations above and parallel to said base, each tier member having a central aperture to accommodate the pipe, and being pierced to accommodate said culturing pipettes; and
      (c) a plurality of vertical supporting members extending upwardly from the outer edge of said base, being fixed to the outer edge of each of said tiers, and terminating at or above the uppermost of said tier members.

6. A biological incubator as defined in claim 5 wherein, in said removable support means, the planar base has a central aperture to accommodate the pipe.

7. A biological incubator as defined in claim 5 wherein, in said removable support means, said supporting members terminate above the uppermost tier member in grasping rings.

8. A biological incubator as defined in claim 5 wherein, in said removable support means, said supporting members terminate above the uppermost tier member in a fold-away handle.

9. A biological incubator as defined in claim 1 wherein said means to heat said annulus are electrical heating means.

10. A biological incubator as defined in claim 9 wherein said electrical heating means comprise incandescent light bulbs, heating tapes or cartridges heaters in combination with a source of electrical energy.

11. A biological incubator as defined in claim 9 wherein said electrical heating means includes, in combination, a temperature sensitive element located in the annulus to close the electrical circuit when the temperature in the annulus falls below a predetermined level and to open the electrical circuit when the temperature exceeds a predetermined level.

References Cited
UNITED STATES PATENTS

| | | | |
|---|---|---|---|
| 900,493 | 10/1908 | Dewey | 240—1 |
| 2,037,993 | 4/1935 | Miller | 126—360 |

FOREIGN PATENTS

| | | | |
|---|---|---|---|
| 55,936 | 12/1917 | Sweden | 126—360 |

ALVIN E. TANENHOLTZ, Primary Examiner

T. G. WISEMAN, Assistant Examiner

U.S. Cl. X.R.

195—103.5 R, 127